United States Patent [19]
Pedersen

[11] 3,757,474
[45] Sept. 11, 1973

[54] CURVED SURFACE GENERATOR
[75] Inventor: Harry Pedersen, Rochester, N.Y.
[73] Assignee: The Gleason Works, Rochester, N.Y.
[22] Filed: Sept. 15, 1971
[21] Appl. No.: 180,585

[52] U.S. Cl. .............................. 51/33 W, 51/105 R
[51] Int. Cl. ............................................. B24b 7/04
[58] Field of Search ................ 51/32, 33 W, 105 R, 51/105 EC, 165.77, 95 WH; 82/18

[56] References Cited
UNITED STATES PATENTS

| 3,494,388 | 2/1970 | Sanders et al. ..................... 82/18 X |
| 3,595,108 | 2/1971 | Priscsak ................................. 82/18 |
| 3,693,297 | 9/1972 | Cann ........................... 51/95 WH X |
| 2,870,578 | 1/1959 | Baier ..................................... 51/90 |

FOREIGN PATENTS OR APPLICATIONS

| 914,981 | 1/1963 | Great Britain ..................... 51/95 R |
| 1,117,569 | 6/1968 | Great Britain ..................... 51/95 R |

Primary Examiner—Donald G. Kelly
Assistant Examiner—Howard N. Goldberg
Attorney—Morton A. Polster

[57] ABSTRACT

Apparatus for generating complex curved surfaces such as the epitrochoidal bores of rotary combustion engines, e.g., "Wankel" engines. A workpiece is, in effect, fixed to a first imaginary cylinder which is rolled about the inner circumference of a larger second cylinder. A cylindrical cutting tool is positioned to contact the workpiece along a predetermined machining line which is parallel to the axes of the two imaginary cylinders, the machining line also being fixed relative to the larger of the two cylinders and outside of its outer circumference. The relative movement of the tool and workpiece causes the machining line to generate an eiptrochoidal surface on the workpiece, and this generated surface is maintained theroretically exact by maintaining the axis for the cylindrical cutting surface of the tool in a plane passing through the machining line and through the line of instantaneous tangency between the two imaginary cylinders as the smaller cylinder rolls relatively about the inner circumference of the larger cylinder. This combination of complex relative movements is provided by a relatively simple machine format which includes a drive mechanism utilizing three separately driven rotating gear members. The two members which simulate the rotation of the " imaginary" generating gears are concentrically mounted and do not intermesh or otherwise run relatively around the circumferences of each other, and all three drive gears rotate about axes which remain substantially fixed relative to each other at all times during machine operation.

27 Claims, 10 Drawing Figures

HARRY PEDERSEN
INVENTOR.

BY Morton A. Polster

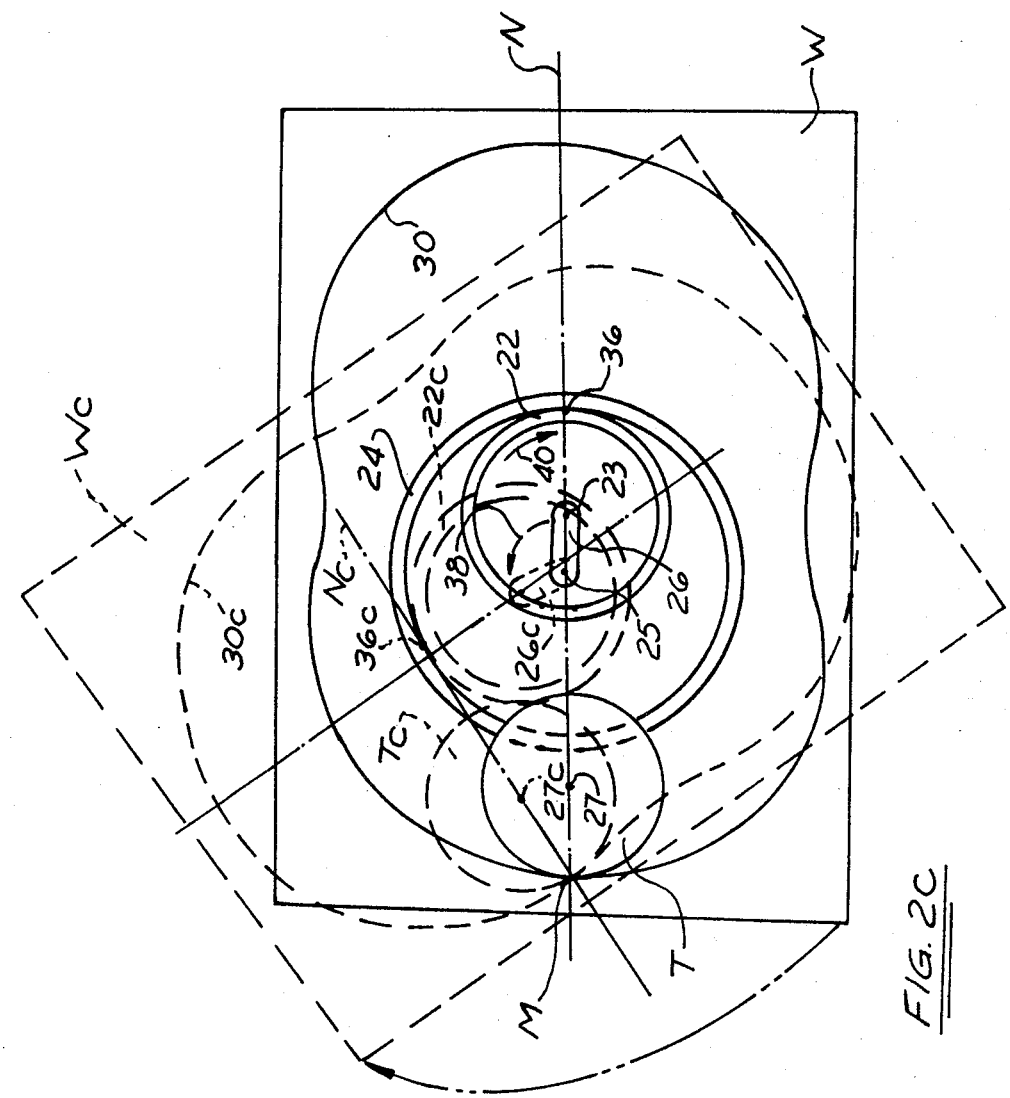

CURVED SURFACE GENERATOR

The invention herein relates to apparatus for generating curved surfaces, and more particularly to the generation of such complex shapes as the epitrochoidal bores of rotary combustion engines.

BACKGROUND OF THE INVENTION

While the invention is generally applicable to the machining of all types of curved surfaces, it will be described with most particularity from the standpoint of machining bores for rotary combustion engines, e.g., "Wankel" engines. While this new form of internal combustion engine has not as yet received exceptionally widespread usage, it is quite well known and seems to be gaining rapidly in popularity, primarily because of its significant advantages over more conventional internal combustion engines in relation to the part and weight reductions which can be realized.

As is well known, such rotary combustion engines utilize three-sided rotary pistons which revolve about an eccentrically orbiting axis, and the bore of the cylinder in which these pistons ride has an epitrochoidal shape.

The machining of epitrochoidal bores for rotary combustion engines has presented a major problem in that this shape is neither circular nor elliptical and, therefore, is not readily amenable to machining by standard milling, shaping, and grinding apparatus. In general, most present methods of machining such epitrochoidal bores involve tracing the desired tool motion from suitable cam shapes, However, such tracing systems are far from satisfactory, particularly when extreme accuracy is required in such operations as final grinding.

One of the problems with such prior art tracing systems arises from the fact that the surface being traced is neither circular or rectilinear and, therefore, lines traced "parallel" to the cam shape will not reproduce the shape of the cam. That is, it is geometrically axiomatic that when tracing a line parallel to a given geometric shape, a figure geometrically similar to the original shape will be reproduced by such parallel lines only if the original shape is either circular or rectilinear. Lines drawn parallel to any non-circular and non-rectilinear shapes do not produce a figure similar to the figure being traced. Therefore, it can be appreciated that, as grinding wheels wear down in such prior art systems, the surface of the grinding wheel no longer traces the original shape but rather traces a line parallel to the original shape and, since epitrochoids are neither circular nor rectilinear, the resulting form produced by the worn grinding wheel is no longer geometrically similar to the original cam shape. One method used by prior art systems to overcome these problems comprises using cam followers having diameters which vary directly as the diameter of the grinding wheels being used so that, as the latter become more and more worn by repeated dressing, smaller and smaller cam followers are used to trace the cam.

Further, even when operating properly, many such prior art tracing systems do not produce theoretically perfect surfaces, since the cutting surface of the machining tool is not maintained theoretically tangent to the surface being machined at all times. Since all cutting tools are, by definition, wider than a "geometric line," any lack of instantaneous tangency at the moment of cutting necessarily results in a deviation from a theoretically perfect surface.

Many prior art patents disclose apparatus for machining epitrochoidal surfaces by "generation," as distinguished from "tracing," and the generating kinematics of all of these prior art machines are based upon one or the other of two geometric definitions of an epitrochoid. The first defines an epitrochoid as the locus of a point fixed within a first circle which rolls about the outer circumference of a larger second circle.

In the second geometric definition, an epitrochoid is the locus of a point fixed in relation to, and outside the circumference of, a first circle as the inner circumference of that first circle is rolled around the outer circumference of a smaller second circle. While these known generating devices do not suffer from the many problems referred to above which plague tracing-type apparatus, they are all extremely complex mechanically in relation to both basic generating kinematics and to the means utilized for maintaining theoretical tangency between the cutting surface of the tool and the surface being generated.

Regardless of the geometric definition upon which epitrochoidal generation is based, most known prior art generators utilize drive trains including actually intermeshed gear wheels which are equivalent in effective diameters to theoretical circles required by the geometric definitions referred to above, and in most cases such generating gears literally roll relatively about the outer or inner circumferences of each other. To state this in a different way, these known prior art generators are designed to use the same size gears for generation as are used in the engine to drive the rotor relative to the bore, and this universally prevalent prior art machine format has several disadvantages. First of all, such actually sized gearing is relatively small and, as such, small variations in angular position, backlash, etc., have fairly noticeable effects on the accuracy of the surface being generated. In other words, with such gearing it is difficult to maintain the very precise machining motions required for acceptable Wankel engine bores. Further, any change in engine bore size specifications often requires that the basic drive of the machine be dismantled and a completely different set of gearing be substituted. Finally, since such intermeshed gearing is not and cannot be separately driven, such prior art generator is totally dedicated to the manufacture of one particular epitrochoidal shape.

The prior art also includes lathe-type machines for turning or boring non-circular trochoidal shapes (e.g., U.S. Pat. Nos. 3,494,388 and 3,595,108), and some of these machines do not utilize intermeshing generating gears which literally roll about each other. However, while such machines are capable of forming epitrochoidal surfaces, they are designed to use single-point type cutting tools and cannot be used for precision work with high-speed cylindrical cutting tools.

As noted above, precision generation requires that the cutting surface of the machining tool be maintained at all times theoretically tangent to the surface being generated. To achieve this necessary tangency, some prior art generators, such as that disclosed in British Patent No. 914,981, superimpose further complex motions on the basic generating motion, while other prior art machines (e.g., U. S. Pat. No. 2,870,578) utilize intricate combinations of cranks, slides, slip joints, etc., to construct a mechanical equivalent of the theoretical geometric perpendicular. That is, as explained in greater detail below, it is known that the perpendicular to any point on the surface of an epitrochoid passes through the instantaneous point of tangency between the generating circles at the instant that point is generated, and those prior art machines which try to achieve such tangency either move the workpiece or the cutting tool by means of a mechanism including one member positioned at all times in actual physical alignment with the instantaneous mesh point between the generating gears. Needless to say, in addition to being complex and expensive, such prior art machinery is mechanically congested and therefore, difficult to support and maintain for accurate operation.

SUMMARY OF THE INVENTION

The invention herein comprises a remarkably simplified machine format for generating epitrochoidal shapes. It is based upon generating kinematics related to the second geometric definition of an epitrochoid: the workpiece is effectively fixed to a first imaginary cylinder which is then rolled relatively about the inner circumference of a second imaginary cylinder. The tool is positioned so that its cylindrical cutting surface contacts the workpiece along a machining line which is parallel to the axes of the two imaginary cylinders, the machining line being fixed relative to the larger of the two cylinders and outside of its outer circumference. The relative movement of the tool and workpiece cause the machining line to generate an epitrochoidal surface on the workpiece, and this generated surface is maintained theoretically exact by maintaining the axis for the cylindrical cutting surface of the tool in a plane passing through the machining line and through the line of instantaneous tangency between the two imaginary cylinders as the smaller cylinder rolls relatively about the inner circumference of the larger cylinder.

It will be noted that the generating cylinders are referred to as "imaginary" because the invention herein, as different from prior art generators, does not use generating gears which duplicate either the theoretical geometric generating circles or the actual gearing used in the engine. Quite the contrary, the subject invention utilizes a machine format in which the generating drive is no longer dependent upon the heretofore direct interconnection between the means for rotating the work table and the means for orbiting the axis about which the work table rotates.

In the preferred embodiment disclosed herein generation is accomplished as follows: a first drive gear rotates a crank member which carries, in an eccentric bearing, the axis of rotation of the work table. A second drive gear rotates the work table. This second drive gear does not intermesh with the first drive gear, i.e., one generating gear does not run around the inner or outer circumference of the other. In fact, these two drive gears are concentrically mounted and, in effect, are separately driven but in a timed relationship such that their relative rotations simulate the rotations which would occur were the work table fixed to a first imaginary gear which intermeshed with and run around the inner circumference of a larger second imaginary gear. Because the generating drive gears of the invention do not intermesh with each other, there are no theoretical size limitations for these first and second generating drives, and they can be built with as large a circumference as is deemed necessary to achieve the accuracy desired, i.e., large enough so that normally-experienced elasticity in the drive train will not result in unacceptable movement variations in the work table relative to the cutting tool, a problem which, as noted above, prevented the successful operation of prior art epitrochoidal generators.

Further, the eccentricity of the bearing which is carried by the crank member and supports the axis of the work table, is adjustable and, more importantly, the adjustment of this bearing does not affect the generating drive. Thus, as distinguished from the operation of prior art generators, this feature makes it possible to alter the size of the epitrochoidal surface which is being generated without requiring any change of the generating drive gears.

As just noted above, the separately driven first and second drive gears are concentrically mounted and, since the work table rotates about an axis eccentric to the common axis of these drive gears, an Oldham coupling is used to provide driving engagement between the second drive gear and the work table.

As to the tool-holding portion of the generator, the invention utilizes extremely simple apparatus to assure that the cutting surface of the tool remains tangent at all times to the surface of the desired generated shape. As mentioned above, at any instant during the theoretical geometric generation of an epitrochoid, a line drawn between the generating point and the instantaneous point of tangency between the generating circles will be perpendicular to the surface being generated. Again, since there are no actual intermeshing generating gears in the invention herein, the plane which theoretically passes between the machining line and the instantaneous mesh point of the imaginary generating cylinders, is also imaginary. The actual tool support mechanism merely comprises a lever arm, pivoted at the machining line, and driven by a crank arm rotated by a third drive gear so that the movement of the lever arm simulates the theoretical movement of the imaginary plane. In the preferred embodiment, the crank arm driving the tool-holding lever arm is positioned remote from the work-holding table, further reducing machine congestion and making possible greater stiffness and easier maintenance.

While only the presently preferred form of the apparatus is disclosed in detail, three different possible machine configurations are discussed.

In describing the invention with greater particularity, reference will be made to the accompanying drawings in which like reference characters designate corresponding or theoretically similar parts throughout the several views and in which:

FIGS. 2A, 2B and 2C show, respectively, three different possible kinematic machine configurations for the novel curved surface generator disclosed herein;

GEOMETRIC BASIS FOR GENERATION

Figure 1A:
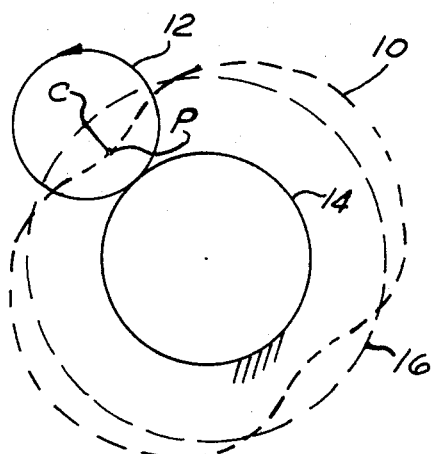
FIGS. 1A and 1B illustrate, respectively, the two geometric definitions for epitrochoids.
Figure 1B:
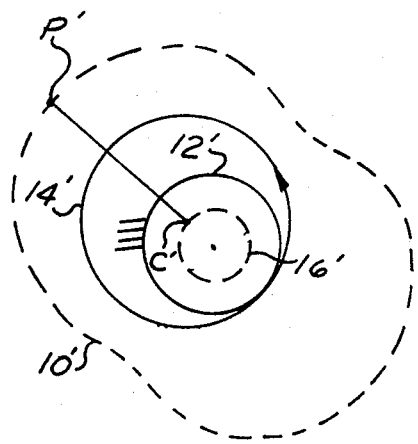

Referring now to FIGS. 1A and 1B, the two geometric methods for defining epitrochoids are shown. In FIG. 1A, the epitrochoidal shape 10 is shown in dashed lines. If a smaller circle 12 is rolled about the outer circumference of a larger circle 14, the locus of center C of the smaller circle is a third circle 16 having a radius equal to the sum of the radii of circles 12 and 14. However, the locus of any point P within smaller circle 12 is a curved line 10 called an "epitrochoid."

It is possible, geometrically, to define an epitrochoidal curve in another manner, and this is shown in FIG. 1B. Smaller circle 12' is fixed within larger circle 14'. If the inner circumference of the larger circle is rolled about the outer circumference of the smaller inner circle, the locus of the center C' of the larger circle is a third circle 16' smaller than the other two circles, namely, the radius of the third circle being equivalent to the difference between the radii of circle 14' and 12'. The locus of a point P' fixed relative to and outside of larger circle 14' is an epitrochoid 10'. Special attention is called to the geometric definition illustrated in FIG. 1B, since it will serve to facilitate understanding of the novel apparatus disclosed herein and to substantiate the effectiveness of the method utilized by the invention for generating theoretically perfect epitrochoidal surfaces.

THREE KINEMATIC VARIATIONS OF THE GENERATION METHOD

Figure 2A:
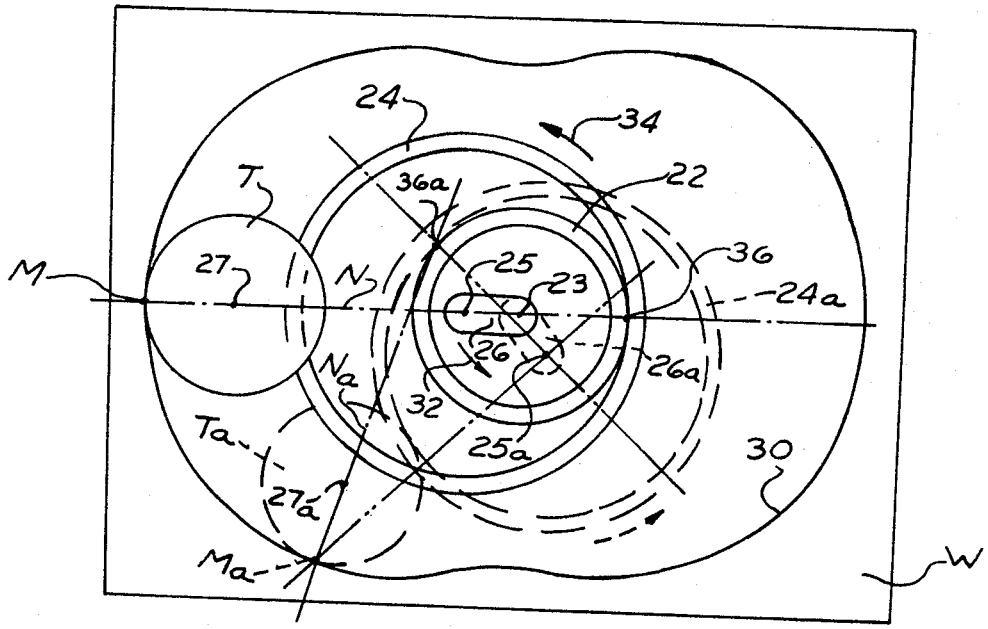
Figure 2B:
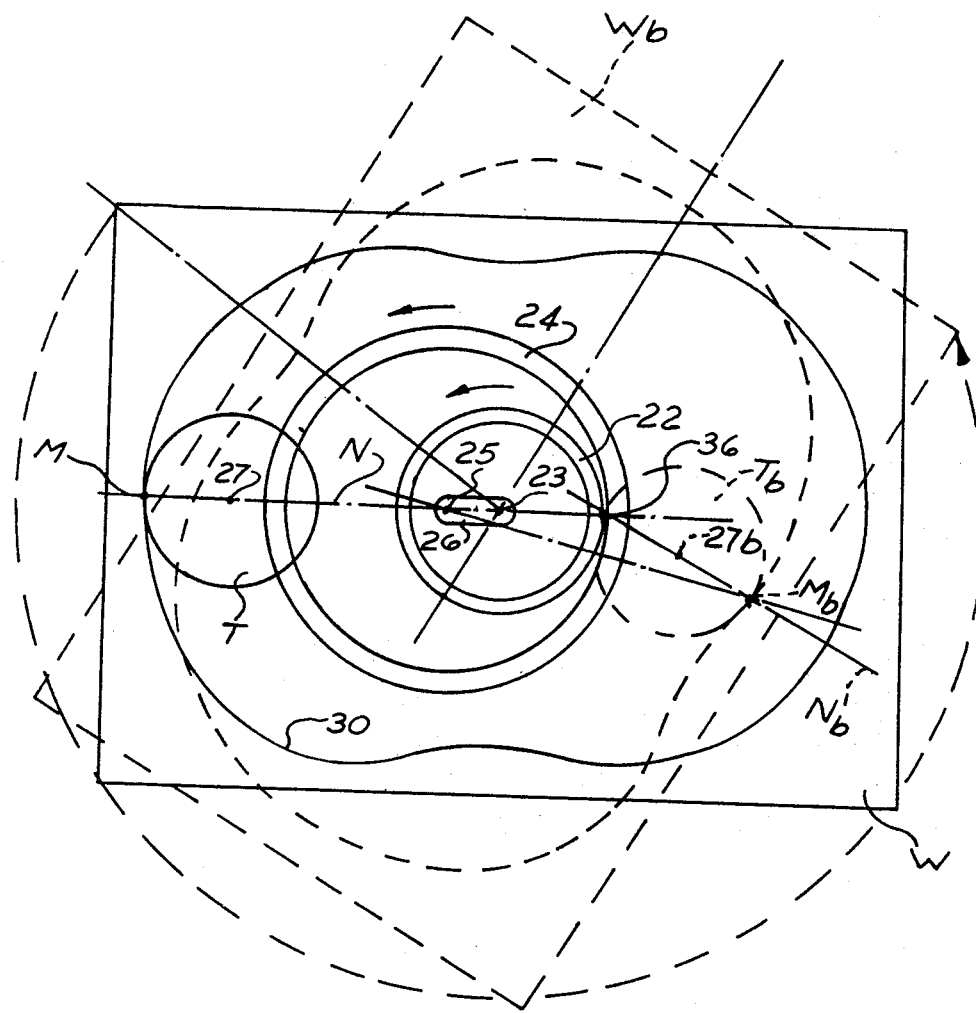

FIGS. 2A, 2B and 2C illustrate three different theoretical systems of machine kinematics, any one of which may be utilized by apparatus according to the invention herein to generate epitrochoidal surfaces. In each of these machine embodiments, a workpiece W is fixed to a first cylinder 22 positioned so that its outer circumference is tangential to the inner circumference of a second larger cylinder 24. The two cylinders, which have respective axes 23 and 25 connected by a crank 26, are adapted to permit relative movement between them without slippage, e.g., the larger cylinder may comprise an internal gear while the smaller cylinder may comprise an external gear having mating teeth. Also, in each of the three different embodiments a tool T is positioned so that its cutting surface passes through a machining line M which is parallel to axes 23 and 25 and fixed in relation to larger cylinder 24 outside of the latter's outer circumference. For purposes of this disclosure, it will be assumed that tool T is a grinding wheel. However, it should be noted that tool T may be any type of tool having a cylindrical cutting surface, for instance, a milling cutter or a shaping tool may be used as well as a cylindrical grinding wheel.

In each of the three machine embodiments shown in FIGS. 2A, 2B and 2C, the axis 27 of the cutting surface of tool T is maintained at all times in an imaginary plane containing machining line M and the instantaneous line of tangency between cylinders 22 and 24 (this instantaneous imaginary plane being represented in the drawings by the lines N, $N_a$, $N_b$, and $N_c$). By providing a relative rolling of smaller cylinder 22 about the inner circumference of larger cylinder 24, and by fixing a machining line M relative to larger cylinder 24, as explained above, it can be seen that the locus of machining line M will generate an epitrochoidal surface in the same manner as line 10' was traced geometrically in FIG. 1B. It can also be shown geometrically that imaginary plane N, defined in the manner just described above, will always be perpendicular to the generated surface 30. Therefore, since tool T has a cylindrical cutting surface, as long as axis 27 of this cutting surface remains in imaginary plane N, tool T will always theoretically be cutting workpiece W along machining line M with its cutting surface tangent to generated surface 30.

Thus, it will be understood that the basic geometric method underlying the three schematic machine embodiments shown in FIGS. 2A, 2B and 2C provides a means for machining true epitrochoidal surfaces on workpiece W. In this regard, it should be noted that tool T does not necessarily have to be positioned to machine an internal bore in workpiece W but could also be used to machine curved outer surfaces as well merely by positioning tool T on the outside of machining line M but still, of course, retaining axis 27 at all times in imaginary plane N.

The three machine embodiments shown in FIGS. 2A, 2B and 2C all differ kinematically, even though they share the similarities of the method discussed above, e.g., workpiece W always being fixed to inner cylinder 22, machining line M always being fixed relative to and outside of larger cylinder 24, etc. In the embodiment shown in FIG. 2A, workpiece W and smaller cylinder 22 are fixed, and the relative rolling motion is obtained by orbiting larger cylinder 24 about the outer circumference of the smaller inner cylinder. In this embodiment, crank 26 is rotated about axis 23 of cylinder 22 causing axis 25 of larger cylinder 24 to orbit in the direction of arrow 32. At the same time, larger cylinder 24 is rotated about its axis 25 in the direction of arrow 34. Thus, while workpiece W remains fixed, the cutting surface of tool T revolves and orbits with larger cylinder 24 to generate surface 30. Assuming that the ratio of the effective diameters of the two cylinders is 3:2, crank 26 must turn two complete revolutions to cause machining line M to generate the complete surface 30. This general machine motion is illustrated by showing a second position for the moving machine parts in dotted lines. Thus, when crank 26 moves to the position indicated by reference numeral 26a it orbits center 25 of larger cylinder 24 to the position indicated by reference numeral 25a, the original point of tangency 36 between the two cylinders being rolled around to point 36a. At the same time, tool T is moved to position $T_a$, thereby maintaining its cylindrical cutting surface on the machining line (which has moved to $M_a$) and retaining its same relative position to larger cylinder 24. However, special attention is called to the fact that during this movement of tool T its axis 27 has not remained fixed relative to larger cylinder 24 but rather has moved relatively (to the left in the drawing) to remain on the new instantaneous imaginary plane $N_a$ which no longer passes through axis 25 (now moved to 25a) but instead passes through the new machining line $M_a$ and the instantaneous point of tangency 36a. While the general machine structure shown in FIG. 2A allows the workpiece W to remain in a fixed location, it is considered the least desirable of the three disclosed kinematic embodiments.

In the embodiment disclosed in FIG. 2B, crank member 26 remains fixed, i.e., both small cylinder 22 and large cylinder 24 revolve about their respective axes 23 and 25 which remain fixed in space. Since workpiece W is fixed to cylinder 22, it revolves with cylinder 22, as indicated in the drawing by the dashed lines and reference letter $W_b$. Again assuming a ratio of effective cylinder diameters of 2:3, when workpiece W rotates with cylinder 22 to the position indicated by the reference letters $W_b$, large cylinder 24 rotates in the same direction, but only two-thirds as far, moving the machining line with it to the new position indicated by the reference letters $M_b$. Tool T follows this movement to maintain its cutting surface on the machining line, but again attention is called to the fact that, as the tool moves from its original position to the position indicated by the reference letters $T_b$, the axis of the cutting surface of tool T has not remained fixed in relation to larger cylinder 24 but rather has moved relatively (to the right in the drawing) to the position indicated by reference numeral $27_b$, namely, the axis remains on the imaginary plane established at any given instant in time by both the machining point and the point of tangency between the two cylinders. (In this case, of course, the point of tangency between the two cylinders remains fixed while the machining line moves with cylinder 24.) While this particular embodiment is the simplest kinematically, it has practical disadvantages relating to machine rigidity and to the supplying of power to the spindles.

FIG. 2C schematically illustrates the general kinematic format of a preferred embodiment of apparatus for carrying out the invention disclosed herein. According to this third variation, the larger cylinder 24 remains fixed, while crank 26 rotates to orbit axis 23 of smaller cylinder 22 in the direction of arrow 38. At the same time, smaller cylinder 22 rotates about its axis 23 in the direction of arrow 40. Therefore, the workpiece both rotates and orbits with smaller cylinder 22, while machining line M remains fixed. These relative motions can be visualized with the help of the dotted line elements in FIG. 2C which indicate that when crank 26 moves to the position indicated by reference numeral 26c, smaller cylinder 22 rotates and orbits to the position indicated by reference numeral 22c, carrying the workpiece to the position indicated by the reference letters $W_c$ and causing the instantaneous line of tangency between the cylinders to move from point 36 to point 36c.

While machining line M remains stationary in this embodiment, attention is once again called to the fact that tool T does not remain stationary. In order to maintain theoretical tangency between the cylindrical cutting surface of the tool and generated surface 30, tool axis 27 oscillates about machining point M so that it remains on the imaginary plane containing both machining point M and the instantaneous line of tangency between the cylinders. (At the instant shown in dotted lines, the tool axis is at the point indicated by reference numeral 27c.)

It should be understood that the large and small cylinders indicated in each of the three embodiments just described above are not actually reproduced in practical machine embodiments. That is, the invention herein is based upon the fact that any mechanism which kinematically reproduces the motion represented by the relative movements of cylinders 22 and 24 and of crank 26 will produce the desired generation. Therefore, since the novel generating apparatus of the invention does not utilize any generating drive gears which roll about the circumferences of each other, it can be said that cylinders 22 and 24 may be considered "imaginary" in the same sense that the blades of a face mill cutter used in a gear generating machine can be said to represent a single tooth of an imaginary gear mating with the gear being cut.

OSCILLATING TOOL SUPPORT VARIATIONS

Figure 3A:
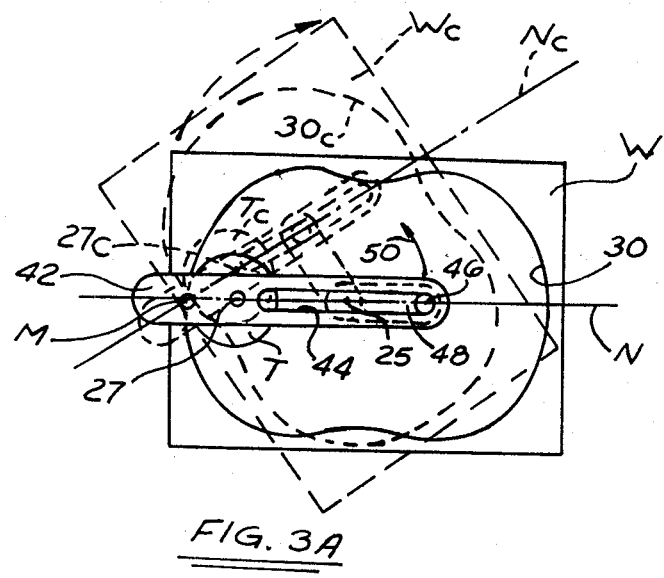
FIGS. 3A and 3B are schematic representations of two possible variations of apparatus for maintaining the cutting surface of the tool theoretically tangent to the surface being generated by the preferred kinematic arrangement illustrated in FIG. 2C.
Figure 3B:
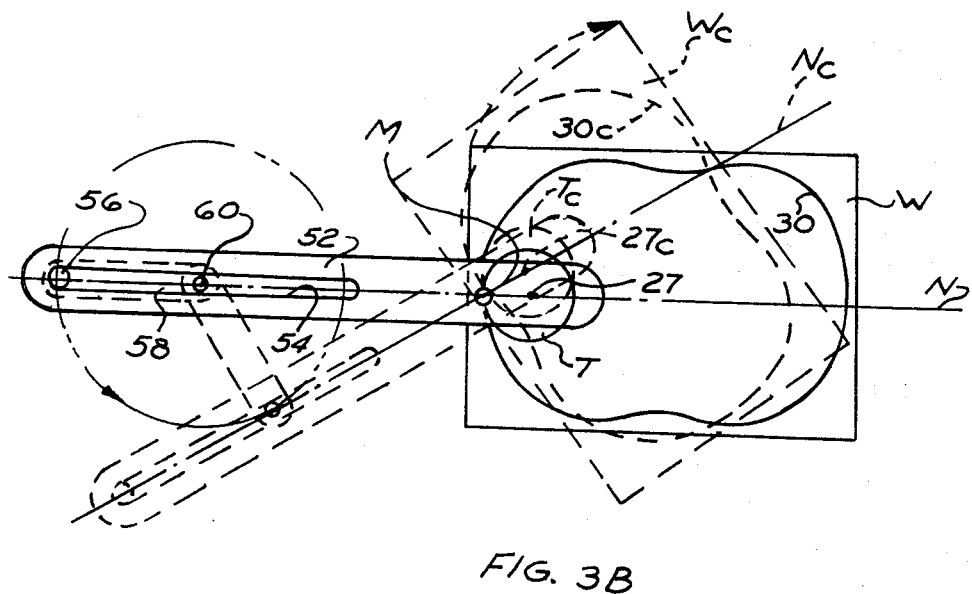

FIGS. 3A and 3B illustrate two possible variations of apparatus which may be used with the preferred kinematic format of the invention to maintain the proper theoretical position of the cutting tool relative to the surface 30 which is being generated. In each of the two variations, it is assumed that the generation is being produced by apparatus operating kinematically in the manner illustrated in FIG. 2C and just described above. Therefore, in both FIG. 3A and FIG. 3B it is assumed that workpiece W has been rotated and orbited in the same manner as shown in FIG. 2C and that tool T has moved similarly, oscillating the axis of its cutting surface from an original position indicated by reference numeral 27 to a new position indicated by reference numeral 27c.

In FIG. 3A tool T is suitably mounted to an oscillating support 42 which is itself pivoted at a point on machining line M. A slot 44 in support 42 receives pin 46 which is mounted to one end of a crank arm 48, the opposite end of the crank arm being pivoted about an axis coincident with axis 25 of large cylinder 24 (see FIG. 2C). The effective length of crank arm 48 is equivalent to the radius of imaginary cylinder 24, and the crank arm is rotated about axis 25 in the direction of arrow 50 at a rate which causes the center of pin 46 to remain at all times coincident with the instantaneous line of tangency 36 between imaginary cylinders 22 and 24. In this manner, tool axis 27 remains at all times on the imaginary plane containing machining line M and the instantaneous line of tangency between the cylinders. This is illustrated in FIG. 3A by showing crank arm 48 rotated from its original position to a dotted line position corresponding to an appropriate movement to match the relative movement of the other machine elements as illustrated with dotted lines in FIG. 2C.

A preferred variation of oscillating tool support apparatus is illustrated in FIG. 3B which, as just noted above, assumes the same relative movement of workpiece W and tool T as was illustrated in FIGS. 2C and 3A. In this embodiment, tool T is similarly appropriately mounted to an oscillating support member 52 which is similarly pivoted at a point on machining line M. Support 52 also includes a slot 54 which receives a pin 56 of a crank arm 58. However, in this case a second crank arm 58 (as distinguished from first crank arm 26 shown in FIG. 2c) is arranged for rotation about an axis 60 which, while parallel to both machining line M and fixed axis 25 of larger cylinder 24 (see FIG. 2C), is relatively remote from the other machine elements. The radius of crank arm 58 is selected so that rotation of the crank will cause the center line of oscillating tool support 52 to remain at all times in the plane N in the manner and for the reasons described above. Again, the relative motion of this tool supporting apparatus is indicated by dotted lines to show the relative position of this apparatus at a point in machine operation when the elements of the machine are in the same relative positions as illustrated in FIGS. 2C and 3A. It should be noted that crank arm 58 rotates in the same direction as crank arm 48 in the embodiment illustrated in FIG. 3A, and in also the same direction as crank 26 as shown in FIG. 2C. However, while it rotates at the same rate as the instantaneous line of tangency of the two cylinders (indicated for two relative cylinder positions by points 36 and 36c in FIG. 2C), pin 56 is 180° out of phase with the instantaneous line of tangency.

As distinguished from the embodiment shown in FIG. 3A, in which the oscillating tool support is driven by a crank having its axis coincident with first crank axis 25, in the preferred variation shown in FIG. 3B second crank axis 60 is positioned remote from first crank axis 25 and the work supporting apparatus, thus avoiding congestion and making it easier to provide greater rigidity and easier maintenance for the tool oscillating mechanism.

PREFERRED APPARATUS

As explained above, apparatus for carrying out the invention does not actually utilize large and small cylinders. In the preferred embodiment of apparatus disclosed in FIGS. 4–6, a work-supporting means (to which workpiece W is mounted) is carried by a crank member in a bearing which is adjustable eccentric to a first axis about which the crank rotates. The work-supporting means is itself rotated about a second axis which passes through the adjustable bearing and is parallel to the first axis of the crank member. In this manner the work-supporting means is rotated about the second axis while that second axis orbits about the first axis, the rates of rotation and orbiting being predetermined in accordance with the speed at which a first imaginary cylinder of suitable diameter would have to roll about the interior of a second larger imaginary cylinder in relation to a fixed point outside the larger cylinder in order to produce the epitrochoidal shape desired.

Work Table

Figure 4:
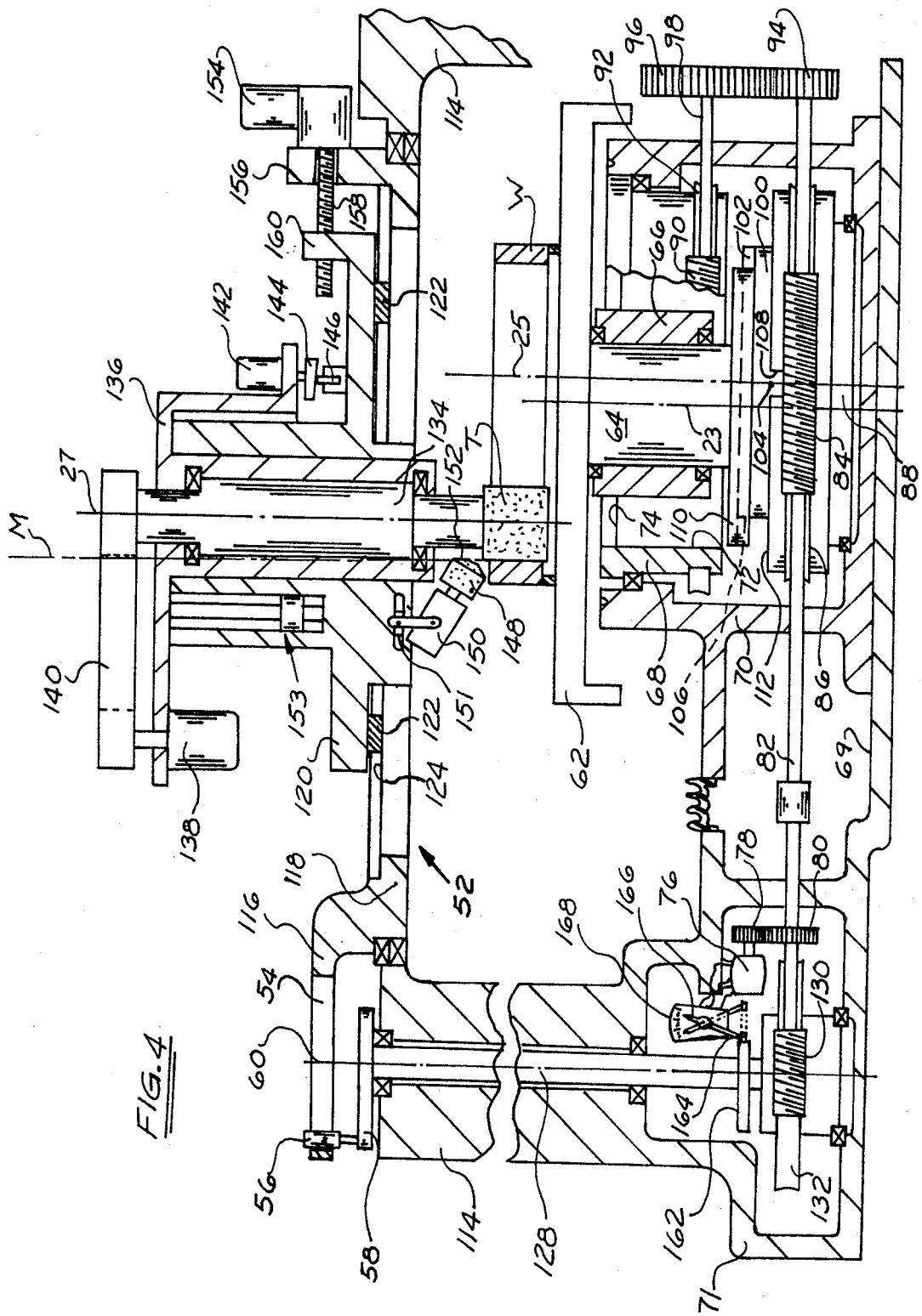
FIG. 4 is a partially schematic and cross-sectional side elevation view of a preferred form of apparatus for the invention disclosed herein.
Figure 5:
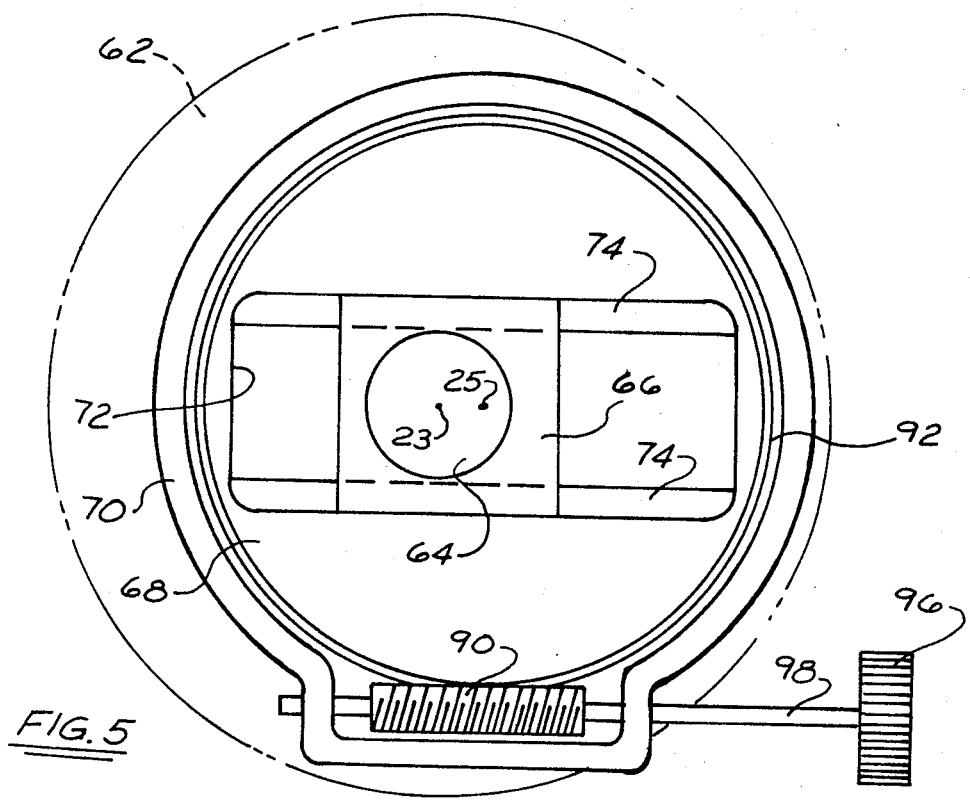
FIG. 5 is a schematic plan view of the work table portion of the apparatus disclosed in FIG. 4.

Referring first to FIGS. 4 and 5, workpiece W is securely mounted to the top of a work table 62 which, in turn, is affixed to a large shaft 64 journaled for rotation within a bearing member 66 about axis 23 which represents the axis of inner imaginary cylinder 22 in FIG. 2C. A drum 68 is journaled for rotation within a slide 70 which, in turn, is adjustable by conventional means (not shown) along suitable ways 69 formed in a machine frame 71. Drum 68 rotates about axis 25, effectively representing crank 26 (of FIG. 2C) which rotates about the axis of fixed larger cylinder 24. Drum 68 has a generally rectangular bore 72 through which bearing member 66 is carried on slides 74. The position of bearing member 66 within bore 72 is adjusted to change the distances between axes 23 and 25, bearing member 66 being suitably secured to slides 74 by clamping means (not shown). Thus, it can be seen that drum 68 acts as a crank means, serving as the kinematic equivalent of crank 26 of FIG. 2C, the rotation of drum 68 effectively causing axis 23 to orbit about axis 25. Also, since drum 68 moves with slide 70, adjustment of the latter varies the distance between axis 25 of the larger imaginary cylinder and the machining line M to alter the size and the proportions of the surface being generated.

Drive Mechanism

The drive mechanism for the work table comprises a motor 76 and a drive train including spur gears 78 and 80 and telescoping shaft 82. The rotation of shaft 82 drives a first worm 84 and its associated first worm wheel 86, the latter having a hub portion 88 suitably journaled in slide 70. Shaft 82 also drives a second worm-worm wheel combination 90 and 92 through a second pair of spur gears 94, 96 and a shaft 98. (Note: portions of drum 68, worm 90, worm wheel 92, and shaft 98 have been removed from FIG. 4 to facilitate illustration of the machine parts.) Second worm wheel 92 is suitably fixed to drum 68 causing the rotation of the latter, while the purpose of worm wheel 86 is to provide the necessary rotation of shaft 64 and work table 62 about axis 23. It will be appreciated that selection of gear ratios for this drive mechanism can be made to simulate different relative diameters for the imaginary cylinders even though the two generating drive gears (worm wheels 86 and 92) do not actually intermesh and even though their actual diameters are not in the ratio of 3:2 (the ratio required of the imaginary cylinders in order to generate a two-lobed epitrochoid such as is utilized as the bore of a Wankel engine).

Since first worm wheel 86 is fixed in slide 70 while work table 62 and shaft 64 orbit eccentrically about axis 25, the necessary driving connection between these members is provided by a conventional Oldham coupling, namely, by a disc 100 having keys 102 and 104 formed on its opposite sides and at 90° angles to each other. Keys 102 and 104 cooperate with respective keyways 106 and 108 formed in the respective lower and upper surfaces of two flanges 110, 112 suitably fixed, respectively, to shaft 64 and worm wheel 86. This coupling arrangement causes shaft 64 to rotate in constant velocity ratio with worm wheel 86 regardless of the relative eccentric displacement between axes 23 and 25. It will be appreciated that this mechanical arrangement makes it possible to vary the size of the epitrochoidal surface being generated without in any way having to change the generating drive mechanism just described above.

Tool Support

Figure 6:
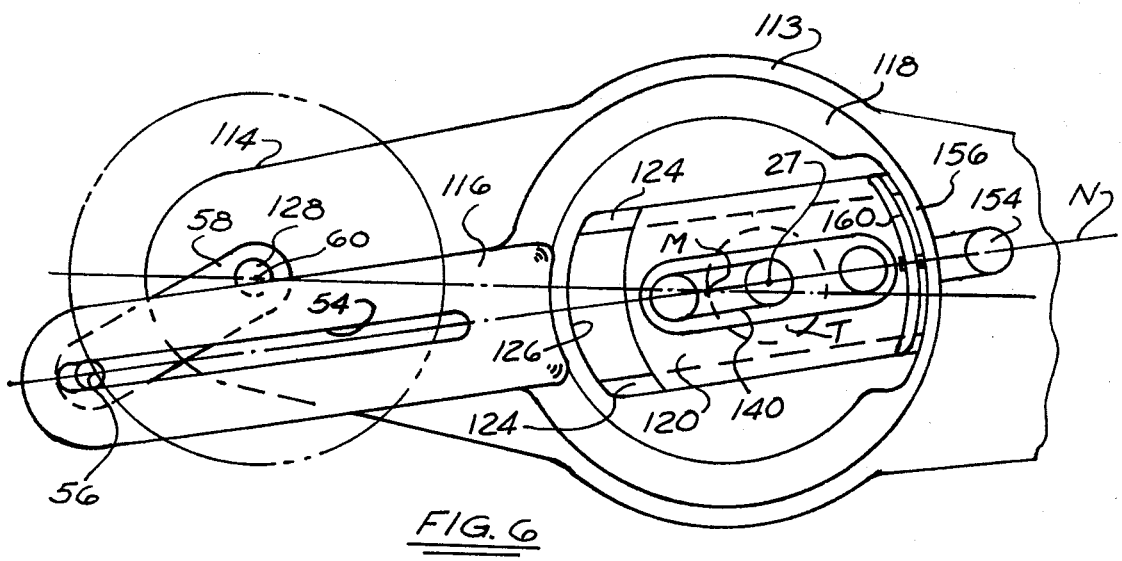
FIG. 6 is a schematic plan view of the tool-holding portion of the apparatus disclosed in FIG. 4.

Referring now to FIGS. 4 and 6, tool T is mounted to apparatus generally supported by an annular section 113 of frame 71 formed between two upstanding column members 114. The oscillating tool support 52 includes two major movable elements, namely, (1) oscillating support 116 shaped like a "frying-pan" and having an annular portion 118 rotatably mounted on annular section 113 of the frame for angular movement about the machining line M, and (2) a slide 120 supported on ball bearing elements 122 to ride on parallel ways 124 formed on the edges of a generally rectangular cavity 126 formed in the center of annular portion 118 of oscillating support 116.

For oscillating the movable tool support elements, a shaft 128 driven by motor 76 through spur gears 78 and 80, shaft 82, worm 130 and worm wheel 132, carries crank arm 58 for rotation about axis 60. Pin 56 at the outer end of crank arm 58 is received in slot 54 formed in oscillating support 116 (in the "handle" of the "frying-pan"). As crank 58 is driven around axis 60, its pin 56 causes support 116 to oscillate about line M (in the manner explained above and also shown in FIG. 3B).

Tool T is mounted to a spindle 134 held in a quill 136 which, in turn, is supported for vertical movement in slide 120. Mounted to quill 136 is a motor 138 which drives spindle 134 by means of a belt 140 and appropriate pulleys.

In order to improve surface finish, tool T is oscillated along its axis 27 by means of a motor 142 which is also mounted on quill 136. Motor 142 carries a face cam 144 which rides over a roller fixed to slide 120, the rotation of face cam 144 acting against roller 146 to raise and lower quill 136 relative to slide 120.

As mentioned above, while the method disclosed herein can be practiced with any cylindrical machining tool, the preferred form of apparatus shown in FIGS. 4-6 uses a cylindrical grinding wheel. This grinding wheel is dressed by a diamond wheel 148 driven by a small dressing motor 150 which can be adjusted and fixed in various positions by a slide mounting 151 on the bottom of annular portion 118 of oscillating tool support 116. Dressing is accomplished as the surface of tool T is moved vertically past tool-shaping edge 152 of diamond wheel 148 by the raising of quill 136 relative to slide 120 by a hydraulic piston-cylinder arrangement indicated schematically at 153.

As grinding wheel tool T wears down, it must also be fed horizontally into the tool-shaping edge 152 of diamond wheel 148. This is accomplished by means of a motor 154 mounted on an outer upstanding flange 156 of annular portion 118 of oscillating support 116. Motor 154 rotates an adjusting screw 158 which is received in a threaded portion of another upstanding flange 160 formed along the outer edge of slide 120. Rotation of screw 158 by motor 154 causes slide 120 to move along the center line of oscillating support 116. Since the rotation of crank 58 is designed to cause this center line to lie at all times in imaginary plane N, it is important to note that this tool wear adjusting mechanism permits axis 27 of tool T to remain properly aligned with the imaginary normal plane N. Therefore, regardless of the diameter of the cutting surface of tool T, the cutting surface of tool T always remains theoretically tangent to the surface being generated on workpiece W. As shown in FIG. 4, dressing motor 150 is adjusted in slide mounting 151 so that the tool shaping edge 152 of diamond wheel 148 is exactly aligned with the machining line M. However, it will be appreciated that the position of tool shaping edge 152 relative to machining line M can be altered in accordance with well-known practices. For instance, those skilled in machining arts will appreciate that, if tool T were withdrawn directly upward from its machining position against the surface being generated in workpiece W, scratching of the generated surface might result. Therefore, in practical operation, prior to vertical movement of tool T (under the control of piston-cylinder arrangement 153) to permit unloading of the workpiece and/or dressing of tool T, motor 154 may also be operated to withdraw the tool slightly away from the workpiece. In such event, the position of tool shaping edge 152 of dressing wheel 148 would be adjusted accordingly to align with the slightly withdrawn position of tool T. Also, as will be obvious to those skilled in the art, when an unfinished workpiece is initially loaded into the work table, motor 154 is used to gradually feed tool T toward its final position, such gradual in-feed being necessary to avoid burning and to prevent excessive cutting loads on the tool. Of course, it will be appreciated that such in-feed could be as well accomplished by suitable small movements of slide 70 on ways 69, or column members 114 could be made similarly movable on frame 71 to provide the desired relative feed motion between tool T and workpiece W.

It should also be understood that if the drive mechanism were run at a constant speed, thereby imparting similarly constant speeds to rotate and orbit work table 62 in the manner explained above, the unusual combined rotating and orbiting movement of workpiece W in relation to tool T would cause workpiece W to pass through machining line M at rates which vary considerably depending upon the particular position of the machine elements in the generating cycle. Since there is often an optimum rate of feed in machining operations, the invention herein includes a variable speed control means including a speed cam 162 fixed to shaft 128. While illustrated in a very schematic manner, it will be understood that a cam follower 164 drives the speed control lever 166 of a rheostat device 168 which controls the circuit energizing motor 76. It will be appreciated that by appropriate shaping of cam 162 it is possible to control the speed of motor 76 to maintain a constant feed of workpiece W to tool T.

Generation of Other Curved Surfaces

While the invention herein has been described primarily for its ability to generate epitrochoidal surfaces, it should be understood that other surfaces can be generated as well. For instance, if tool T is positioned so that its cutting edge is parallel to, but no longer in exact alignment with, machining line M, the tool will no longer generate a true epitrochoid but rather will generate a surface parallel to an epitrochoid. This latter type of surface is often desired when manufacturing the bore of rotary combustion engines because, while the ends of the rotors of such an engine do trace epitrochoidal surfaces, the bore of the engine must be enlarged to accommodate suitable seals which must necessarily extend beyond the ends of the engine rotor. Therefore, the surface traced by the seals is no longer truly epitrochoidal but is rather a surface parallel to a truly epitrochoidal surface. (since, as was noted above, an epitrochoid is neither circular nor rectilinear, a line parallel to it will trace some shape different from a true epitrochoid.)

Similarly, during any particular portion of the generating cycle, motor 154 can be operated to rotate screw 158, thereby altering the position of slide 120 relative to the oscillating support member 116 and causing the machining surface of tool T to move away from or back into alignment with machining line M. It will be appreciated that any such change during generation will alter the shape of the curved surface being generating.

It will also be understood that, by changing gear ratios in the drive mechanism, the size of the imaginary cylinders can be varied to generate other variations of trochoidal surfaces. It should also be noted that in the event bearing member 66 is moved on slide 74 of drum 68 to bring axes 23, 25 into coincidence, tool T will generate a true cylindrical surface.

The method and apparatus of the invention have been disclosed in a relatively schematic manner to facilitate understanding by those skilled in the art without the undesirable clutter of unnecessarily detailed machine drawings, and it will be understood that such obvious-but-omitted details can be readily supplied by persons knowledgeable in the fabrication of machine tools.

What is claimed is:

1. Apparatus for generating epitrochoidal and other curved surfaces on a workpiece comprising:
   frame means;

crank means mounted to said frame means for rotation about a crank axis;

adjustable bearing means carried by said crank means;

work-support means, for holding said workpiece, mounted for rotation about a work-support axis passing through said bearing means parallel to said crank axis for movement with said crank means about said crank axis, the distance between said crank and work-support axes varying in accordance with the adjustment of said bearing means;

tool-support means for holding a tool having a cylindrical cutting surface so that said cutting surface passes in proximity to a predetermined stationary machining line parallel to said crank axis, said tool-support means being mounted for oscillation about a tool-support axis which is coincident with said machining line, and drive means for rotating said crank means and work-support means and for oscillating said tool-support means, respectively, in timed relationships.

2. Apparatus according to claim 1 wherein said drive means comprises separately driven first and second members rotatable about axes fixed respective to each other and drivingly engaged respectively to said work-support means and said crank means.

3. Apparatus according to claim 2 wherein the axes of said first and second rotatable drive members are both coincident with said crank axis.

4. Apparatus according to claim 2 wherein the axes of said first and second rotatable drive members remain fixed relative to each other when the distance between said crank and work-support axes is varied by adjustment of said bearing means.

5. Apparatus according to claim 4 wherein Oldham coupling means drivingly engage said first rotating member and said work-support means.

6. The apparatus of claim 1 further comprising second adjusting means for varying the distance between said crank and tool-support axes.

7. The apparatus of claim 1 wherein said drive means rotates said crank means and work-support means, respectively, in opposite directions.

8. The apparatus of claim 1 wherein said tool-support means comprises a second crank means rotatable about a second crank axis parallel to said first crank axis.

9. The apparatus of claim 8 wherein the distance between said first and second crank axes is greater than the distance between said first crank axis and said work-support axis.

10. The apparatus of claim 8 wherein said drive means rotates said first and second crank means at the same rate.

11. Apparatus of claim 1 wherein said drive means includes means for varying the rate of rotation of said crank means and said work-support means and the rate of oscillation of said tool-support means in accordance with their relative positions.

12. In a machine for generating epitrochoidal and other curved surfaces on a workpiece, said machine having crank means mounted for rotation about a first axis, work-holding means mounted for movement with said crank means about said first axis, said work-holding means also being rotatable simultaneously about a second axis offset from said first axis, and tool-holding means for receiving a tool having an effectively cylindrical cutting surface and positioning said cutting surface in proximity to a stationary machining line parallel to said first axis and located at a predetermined distance from said first axis, the axis of said tool also being substantially parallel to said first axis, the improvement comprising:

movable support means for mounting said tool-holding means, for oscillatory movement about a third axis coincident with said machining line, and drive means for separately rotating, respectively, said crank means and said work-holding means, for timing said separately driven rotations in a relationship predetermined to simulate the relative rotation of a first imaginary cylinder fixed to said work-holding means about the inner circumference of a larger second imaginary cylinder having an axis coincident with said first axis, the distance between said machining line and said first axis being greater than the radius of said second imaginary cylinder, and for oscillating said movable support means to maintain said tool axis at all times so that it lies in an imaginary plane passing through said machining line and through the instantaneous point of tangency between said imaginary cylinders.

13. A machine according to claim 12 wherein said drive means comprises first and second drive members connected for movement, respectively, with said work-holding means and said crank means, each member being separately driven and rotatable according to said predetermined timed relationship about respective axes fixed in relation to each other.

14. A machine according to claim 13 wherein said first and second drive members rotate about axes coincident with said first axis.

15. A machine according to claim 12 wherein said crank means includes adjustable bearing means and said work-holding means is mounted so that said second axis passes through said bearing means, the distance between said first and second axes varying in accordance with the adjustment of said bearing means.

16. A machine according to claim 15 wherein said drive means comprises two separately driven members connected for movement with said crank means and said work-holding means and rotatable about axes coincident with said first axis, the axes of said driven members remaining coincident with said first axis regardless of the distance between said first and second axes as determined by adjustment of said bearing means.

17. A machine according to claim 16 wherein Oldham coupling means drivingly engage one of said driven members and said work-holding means.

18. A machine according to claim 12 wherein said drive means comprises two separately driven cylindrical members connected for movement, respectively, with said crank means and said work-holding means, each said cylindrical member being rotatable according to said predetermined timed relationship and each being larger in circumference than the larger of said imaginary cylinders.

19. The machine according to claim 12 wherein said movable support means is effectively pivoted at said third axis, and wherein said machines further comprises a second crank means operatively engaging said support means and rotatable about a fourth axis, said drive means rotating both said first and second crank means at the same speed.

20. The machine according to claim 19 wherein the distance between said fourth axis and said first axis is greater than the distance between said first axis and said machining line.

21. The machine according to claim 1 wherein said tool is a cylindrical grinding wheel having a tool axis parallel to said machine line.

22. The machine according to claim 21 further comprising wheel dressing means movable relative to said grinding wheel for dressing the surface thereof, said dressing means being positioned to contact the cutting surface of said grinding wheel along a predetermined dressing line which is substantially parallel to said tool axis.

23. The machine according to claim 22 wherein said dressing line is coincident with said machining line.

24. The machine according to claim 23 wherein the distance between said dressing line and said crank axis is less than the distance between said crank axis and said machining line.

25. The machine according to claim 12 further comprising means for moving said tool axis along said imaginary plane relative to said machining line.

26. The machine according to claim 19 comprising further means carried by said support means for moving said tool axis relative to said machining line along said imaginary plane.

27. Th machine according to claim 12 wherein said drive means rotates said crank means about said first axis in a first direction while rotating said work-holding means about the second axis in the opposite direction.

* * * * *